(12) United States Patent
Kustas et al.

(10) Patent No.: US 6,345,655 B1
(45) Date of Patent: Feb. 12, 2002

(54) STORABLE TIRE ASSEMBLY FOR A VEHICLE

(75) Inventors: Frank Mark Kustas, Parker; Suraj P. Rawal, Littleton, both of CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/519,833

(22) Filed: Mar. 6, 2000

(51) Int. Cl.⁷ .............................. B60C 3/08; B60C 5/02
(52) U.S. Cl. ..................... 152/457; 152/450; 152/511
(58) Field of Search .................. 152/457, 152, 152/522, 450, 511

(56) References Cited

U.S. PATENT DOCUMENTS 3,286,759 A * 11/1966 Anderson .................. 152/457
3,570,572 A    3/1971 Cardenas et al.
4,116,255 A    9/1978 Hayakawa et al.

* cited by examiner

Primary Examiner—Adrienne C. Johnstone
(74) Attorney, Agent, or Firm—Marsh Fischmann & Breyfogle LLP

(57) ABSTRACT

The invention is a collapsible tire assembly for a vehicle designed for traveling over terrain. In detail, the tire assembly includes a rim rotatably mountable to the vehicle. An outer tube expandable from a stored condition to an expanded condition is attached to the rim. The outer tube includes side portions and a center tread portion for making contact with the terrain when in the expanded condition. A mechanism is included for mounting the side portions of the outer tube to the rim such that the outer tube forms a chamber. An inner tube is mounted within the chamber expandable from a stored condition within the chamber to an expanded condition expanding the outer tube to the expanded condition such that the center tread portion is supported by the inflated inner tube and the tire assembly is suitable for moving the vehicle over the terrain.

10 Claims, 4 Drawing Sheets

STORABLE TIRE ASSEMBLY FOR A VEHICLE

BACKGROUND OF THE INVENTION

1. Field of the Invention

The invention relates to the field of vehicle tire assemblies and, in particular, to a tire assembly that can be stored on the rim in a collapsed condition and inflated when use is required.

2. Description of Related Art

Vehicle tires designed for the ground exploration of the moon or planets such as Mars have proven reliable. They have either been made of semiridged wire mesh or solid rubber. However, they are heavy and can not be collapsed to conserve space. Thus a collapsible tire would be desirable. Tires that can be stored in the collapsed condition and inflated when required are basically old in the art. They are commonly used on automobiles where storage space for a spare tire is sometimes at a minimum. The tires are typically designed to mount on a conventional rim, thus requiring a reinforced bead area so that sealing thereto can be accomplished without the use of an inner tube. U.S. Pat. No. 4,057,091 "Pneumatic Tire" by J. D. Gardner, et al., U.S. Pat. No. 4,116,255 "Foldable Pneumatic Tire" by H. Hayakawa, et al. and U.S. Pat. No. 3,570,572 Collapsible Tire" by A. Cardenas, et a. are typical examples.

However, while such designs are quite adequate for use on automobiles, they are unsuitable for use on vehicles involved in interplanetary exploration. First of all they are all designed for use with conventional wheel rims and until inflated, one can not be sure that a proper tire to rim seal has been obtained. If there is a leak, there is no way to repair it. Secondly, the use of a conventional tubeless tire to rim seal requires that the tire side walls be stiff, and thus heavier than required for a such missions. Future Mars mission rovers will require very flexible tire walls, have extremely good traction and a very large footprint. The tires will have to be collapsible for storage during transit, but a highly reliable and testable tire to rim seal must be provided.

Thus, it is a primary object of the invention to provide a tire assembly that can be stored in a compact collapsed condition until use is required.

It is another primary object of the invention to provide a tire assembly having an inner tube that can be stored in a compact collapsed condition until use is required.

It is a further object of the invention to provide a tire assembly that can be stored in a compact collapsed and incorporates a protective cover.

It is a still further object of the invention to provide a tire assembly that can be stored in a compact collapsed condition on a vehicle and inflated in place through the rim of the tire assembly.

SUMMARY OF THE INVENTION

The invention is a collapsible tire assembly for a vehicle designed to travel over terrain. In particular, the tire assembly is designed for use on vehicles for exploration on the surface of extraterrestrial bodies such as the planet Mars. In detail, the tire assembly includes a rim rotatably mountable to the vehicle. An outer tube expandable from a stored condition to an expanded condition is attached to the rim. The outer tube includes side portions and a center tread portion for making contact with the terrain when in the expanded condition. The side portions thereof are foldable over the center tread portion when the outer tube is in the stored condition.

A mechanism is included for mounting on the side portions of the outer tube to the rim such that the outer tube forms a chamber. This mechanism includes the rim having first and second circumferential flanges on either side thereof. The side portions of the outer tube have first and second circumferential end portions adapted to mate with the first and second circumferential flanges, respectively. First and second ridged retaining rings are adapted to mate with the first and second circumferential flanges, respectively; and fasteners are used to secure the first and second retaining rings to the first and second circumferential flanges with the first and second circumferential end portions of the outer tube secured to the rim therebetween.

An inner tube is mounted within the chamber formed by the rim assembly and outer tire and is expandable from a stored condition within the chamber to an expanded condition forcing the outer tube to its expanded condition. Thus the center tread portion is supported by the inflated inner tube and the tire assembly is suitable for moving the vehicle over the terrain. A port is provided for connecting the inner tube to a source of pressurized gas for inflating the inner tube to the expanded condition. A protective shield is provided for covering the outer tube when in the stored condition. It includes first and second flexible covers having first ends secured to the rim and seconds ends movable to an over lapping position when the outer tube is in said stored condition. A fastener, preferably a hook and loop type, releasably secures the first and second ends of the first and second covers together.

The novel features which are believed to be characteristic of the invention, both as to its organization and method of operation, together with further objects and advantages thereof, will be better understood from the following description in connection with the accompanying drawings in which the presently preferred embodiment is of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
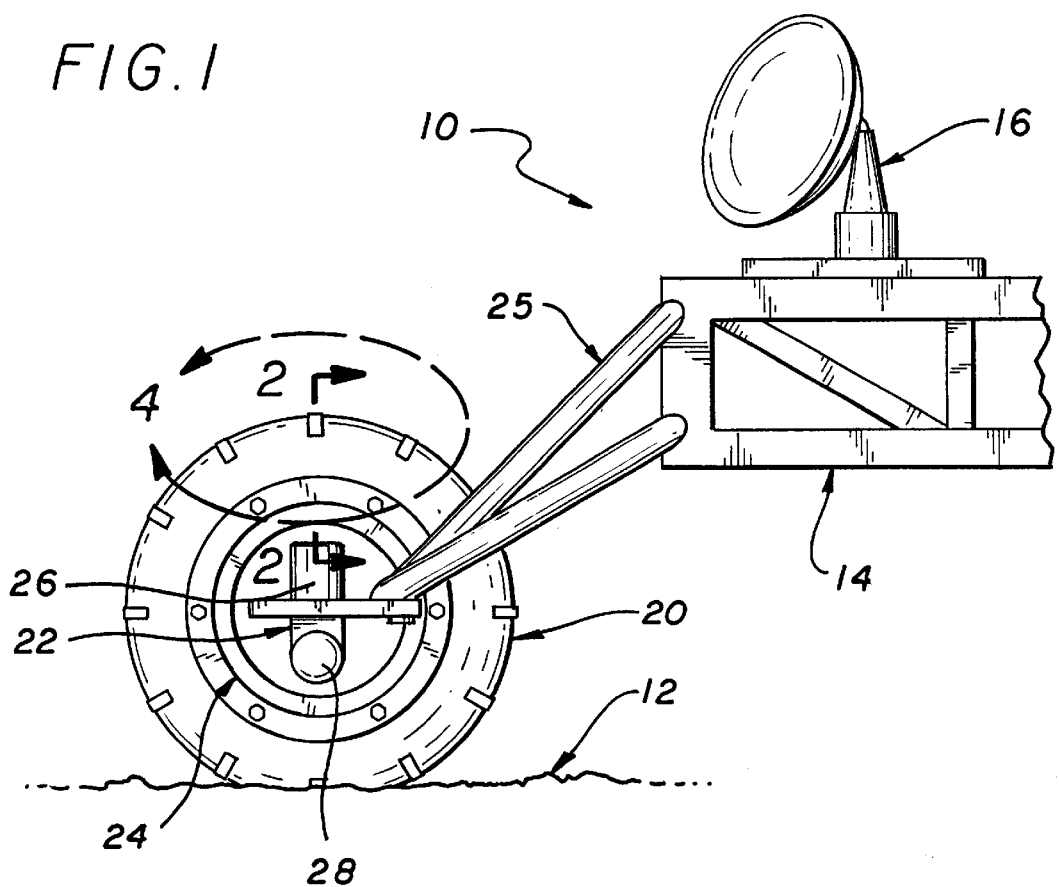
FIG. 1 is a partial side view of a vehicle designed for exploration on an extra-terrestrial body.

In FIG. 1 a portion of a spacecraft 10 capable of roving over the terrain 12 is illustrated. The vehicle 10 includes a frame 14 upon which is mounted equipment suitable for operating the vehicle, conducting scientific experiments, antennas for communication purposes, all generally indicated by numeral 16. Also mounted on the vehicle are a plurality of tire assemblies 20 (only one is shown) for providing movement over the terrain 12.

Figure 4:
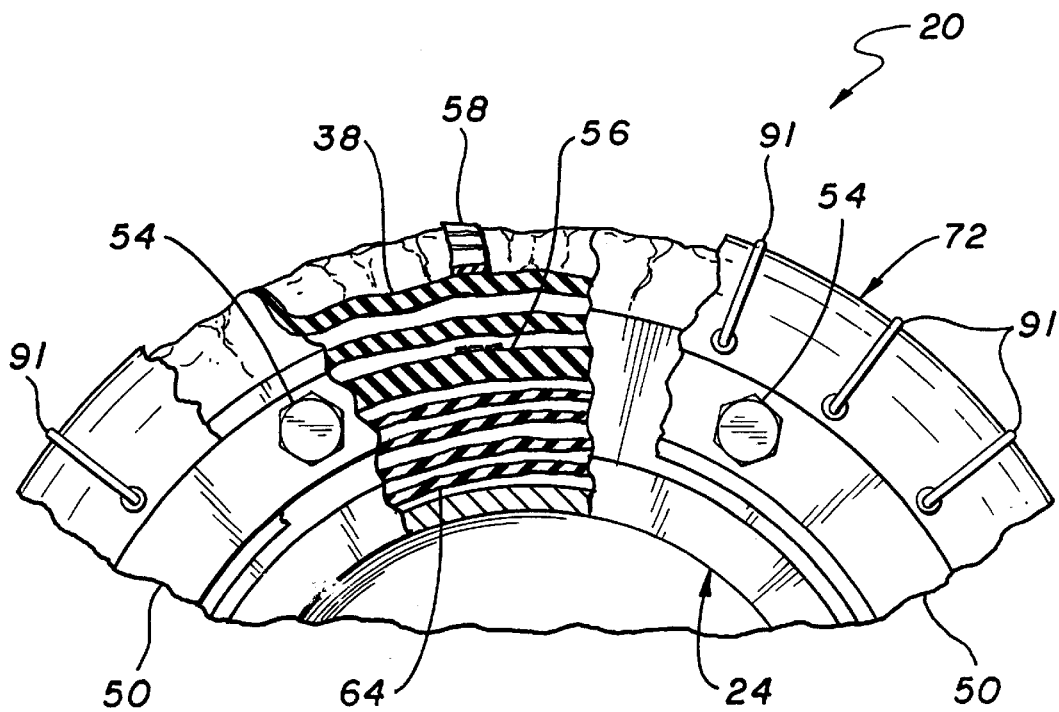
FIG. 4 is a partial cross-sectional view of FIG. 1 taken of a portion of FIG. 1.
Figure 2:
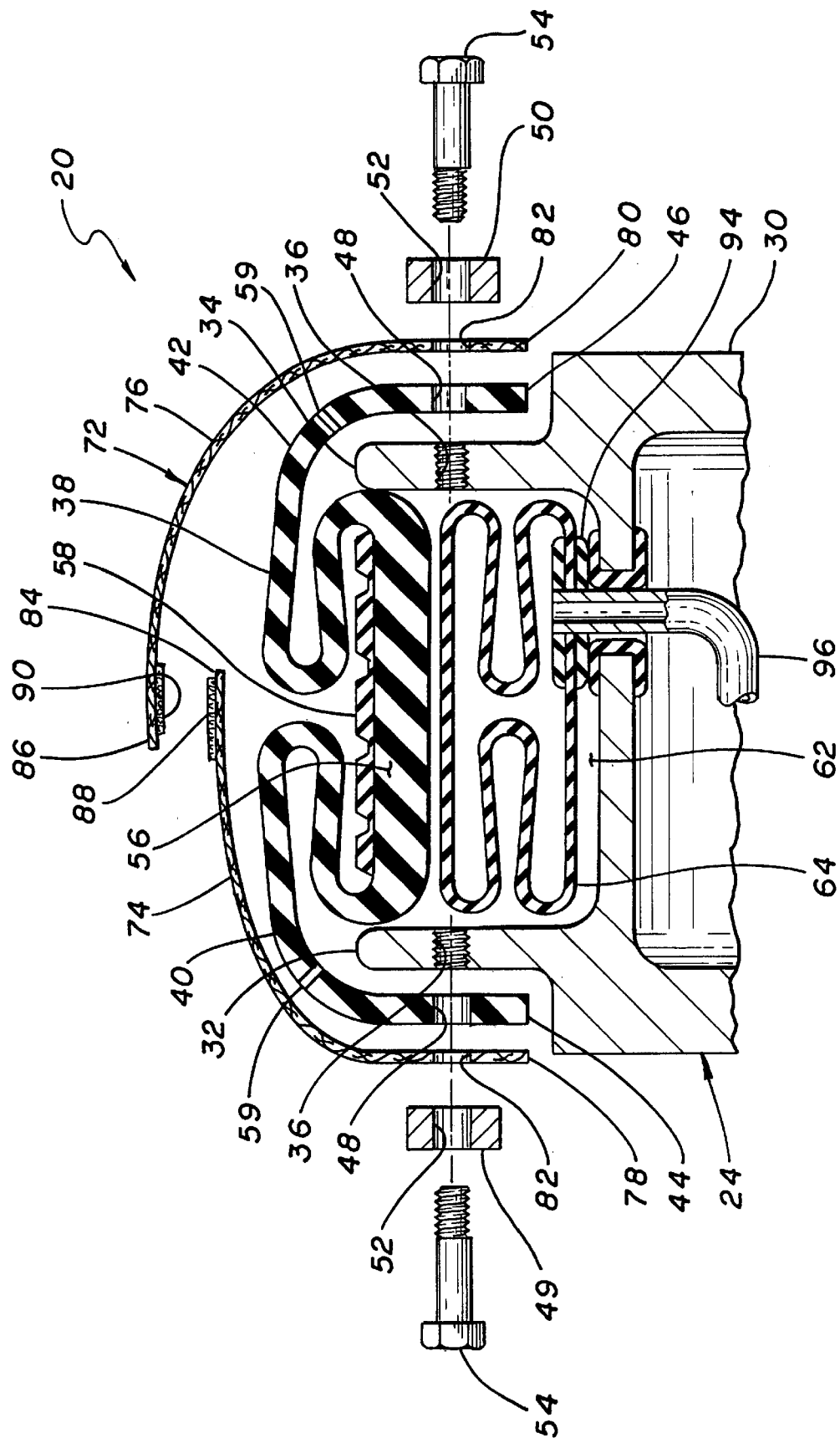
FIG. 2 is an exploded partial cross-sectional view of the tire assembly of the vehicle shown in FIG. 1 taken along the line 2—2 illustrating the tire assembly in the collapsed condition.
Figure 3:
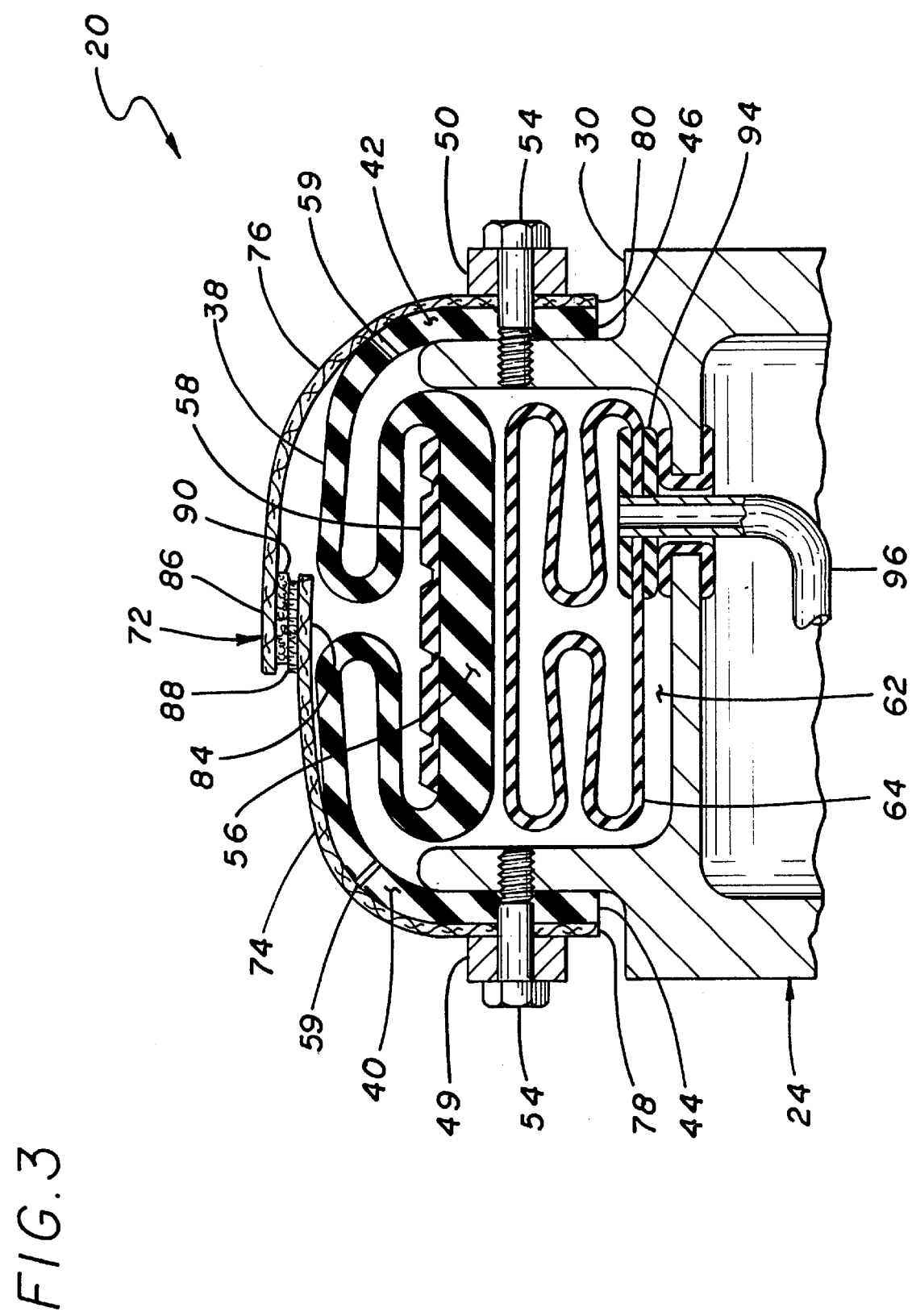
FIG. 3 is an assembled partial cross-sectional view of the tire assembly of the vehicle shown in FIG. 1 taken along the line 2—2 also illustrating the tire assembly in the collapsed condition.

Still referring to FIG. 1 and additionally to FIGS. 2, and 4, which illustrate the tire assembly 20 in the collapsed condition. The tire assembly 20 includes a hub assembly 22 having a rim assembly 24 rotatably mounted thereto. The hub 22 is mounted by means of a strut assembly 25 to the frame of the vehicle 10. Also mounted on the hub 22 are drive motors 26 and 28 for rotating and directional control of the rim assembly 24, respectively. The rim assembly 24 include a rim member 30 having flanges 32 and 34 with the flanges having threaded fastener holes 36 in an evenly distributed pattern. An outer tube 38 includes flexible side walls 40 and 42 with peripheral ends 44 and 46 incorporating holes 48 therein. The peripheral ends 44 and 46 are secured to the flanges 32 and 34, respectively, by means of clamping rings 49 and 50 having holes 52 therein and secured with fasteners 54. The outer tube 38 includes a center portion 56 with flexible rubber tread members 58 bonded or sewn thereto for providing traction when moving over the terrain 12. Additionally, bleed holes 59 are also incorporated into the side walls 40 and 42, the purpose of which will be subsequently discussed. Preferably, the outer tube is made from a liquid crystal thermotropic (melt spun) polyester polyarylate woven cloth with a 200 denier fiber, for example VECTRAN® manufactured by Celanese Acetate, Charlotte, N.C.

In the collapsed condition, the outer tube side walls 40 and 42 may be folded over on top of the center portion 56 (not shown). Referring particularly to FIG. 4, because in the collapsed position the overall diameter of the outer tube 38 is much smaller in diameter, the center portion 56 may also folded over on itself along its circumference (not shown). In addition, the outer tube 38 and rim assembly 24 form a chamber 62 in which is mounted an inner tube 64 that is also folded over on itself. A protective cover assembly 72 covers the outer tube 38. The protective cover includes cover halves 74 and 76 having ends 78 and 80 each having a plurality of holes 82, such that they can be fastened to the flanges 32 and 34 in a manner similar to tubular member 38. The opposite ends 84 and 86 the cover halves 74 and 76 incorporate hook and loop type fastener halves 88 and 90 such that they can be releasably joined together forming the cover. Suitable hook and loop type fasteners can be obtained from Velcro U.S.A., Incorporated, Manchester, N.H. Also attached between the cover halves 74 and 76 are a plurality of elastic strings 91, the function of which will be subsequently discussed. The inner tube 64 includes a fitting 94 coupled to a line 96, which in turn is connected to a source of pneumatic gas (not shown).

Figure 5:
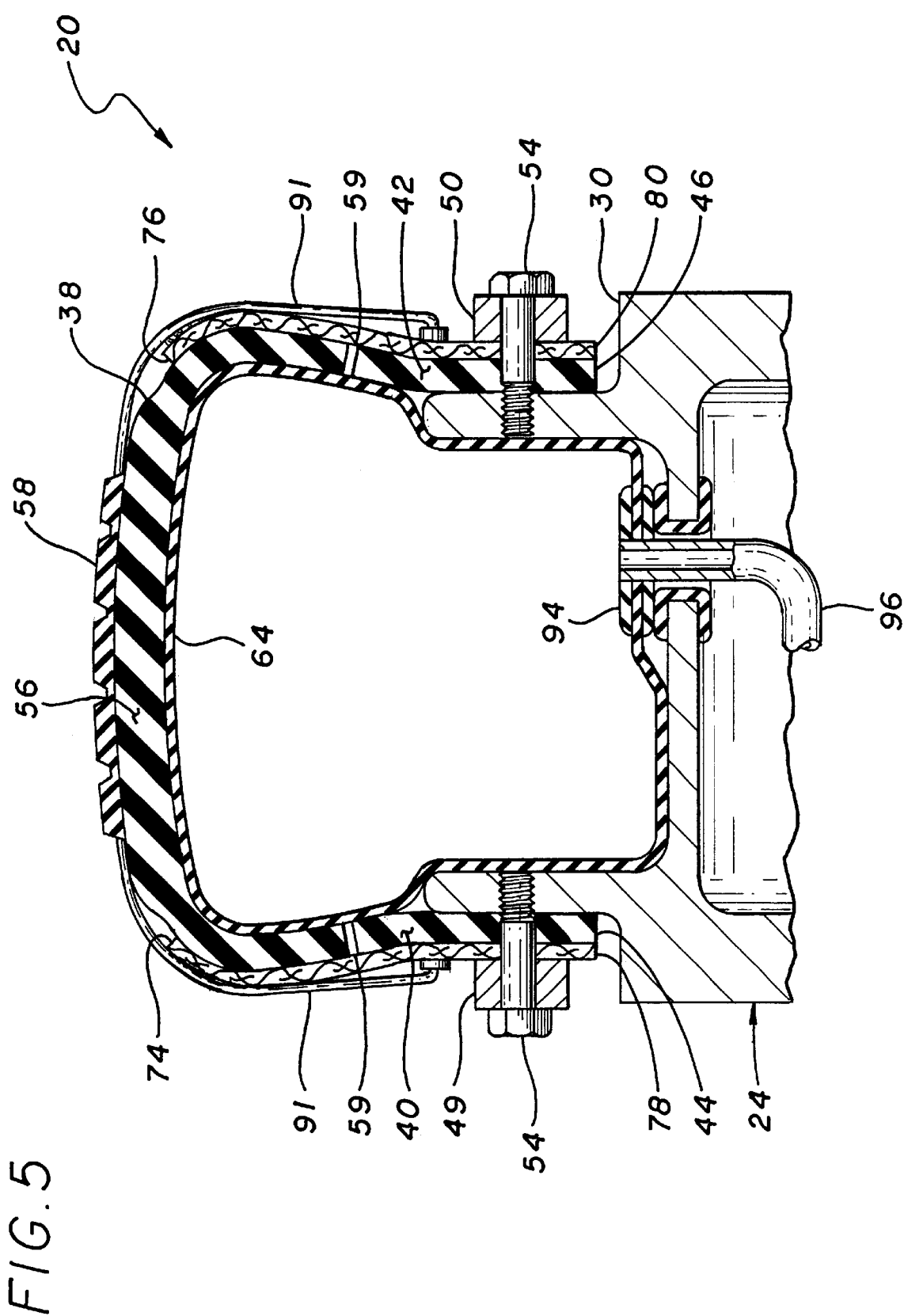
FIG. 5 is a cross-sectional view similar to FIG. 3 illustrating the tire assembly in the expanded condition.

FIG. 5, illustrates the tire assembly 20 in the inflated condition. When the inner tube 64 is inflated through the line 96, it expands forcing the outer tube 38 to also expand, with any gas-trapped therebetween escaping through bleed holes 59. As the outer tube 38 expands it forces the hook and loop type fastener halves 88 and 90 on the protective cover halves 74 and 76 to separate. Thereafter, the outer tube fully expands and the cover halves 74 and 76 fall to the side. However, the elastic strings 91 attached between the cover halves 74 and 76 stretch and hold the cover halves against the fully expanded outer tube. However, the use of elastic strings 91 is not mandatory for the cover halves 74 and 76 can be allowed to just fall to the side of the tire assembly. However, having the cover halves 74 and 76 restrained will prevent them from catching on rocks and the like or collecting dirt after inflation and exposure of the tread 58.

The tire assembly 20 therefore has several significant advantages. First of all it can be effectively leak tested prior to use. It also stores in a very small volume when collapsed. By using an inner tube, it is better protected from gas loss due to a puncture of the outer tube. Furthermore, the pressure level can be varied in accordance with the terrain and soil conditions if so desired, to increase traction efficiency.

While the invention has been described with reference to a particular embodiment, it should be understood that the embodiment is merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to the spacecraft and tire manufacturing industries.

What is claimed is:

1. A collapsible tire assembly for use on a vehicle for traveling over terrain, the tire assembly comprising:

a rim rotatably mountable to the vehicle;

an outer tube expandable from a stored condition to an expanded condition, said outer tube having side portions and a center tread portion for making contact with the terrain when in said expanded condition, said side portions being folded over said center tread portion when said outer tube is in said stored condition;

means to mount said side portions of said outer tube to said rim such that said outer tube forms a chamber;

an inner tube mounted within said chamber expandable from a stored condition within said chamber to an expanded condition expanding said outer tube to said expanded condition such that said center tread portion is supported by said inflated inner tube and said tire is suitable for moving the vehicle over the terrain; and means coupled to said inner tube for receiving a pressurized gas for inflating said inner tube to said expanded condition.

2. The tire assembly as set forth in claim 1 wherein said means to mount said side portions of said outer tube to said rim comprises:

said rim having first and second circumferential flanges on either side thereof;

said side portions having first and second circumferential end portions mating with said first and second circumferential flanges, respectively;

first and second retaining rings mating with said first and second circumferential flanges, respectively; and means to secure said first and second retaining rings to said first and second circumferential flanges with said first and second circumferential end portions secured to said rim therebetween.

3. The tire assembly as set forth in claim 2 wherein said means to secure said first and second retaining rings to said first and second circumferential flanges comprises:

said first and second flanges including a plurality of threaded fastener holes spaced about the periphery thereof;

said circumferential end portions and said retaining rings having fastener holes therethrough spaced about the periphery thereof; and fasteners extending through said holes in said retaining rings and said circumferential end portions and engaging said threaded fastener holes.

4. The tire assembly as set forth in claim 1, or 2, or 3 including a protective cover comprising:

first and second flexible cover portions having first ends secured to said rim and second ends disposed in an overlapping position when said outer tube is in said stored condition; and means to releasably secure said second ends of said first and second cover portions together.

5. The tire assembly as set forth in claim 4 wherein said means to releasably secure said first and second ends of said first and second cover portions together is a hook and loop type fastener.

6. A vehicle for traveling over terrain, said vehicle comprising:

a frame; and a plurality of tire assemblies, each tire assembly comprising:

a rim rotatably mounted to said frame;

an outer tube expandable from a stored condition to an expanded condition, said outer tube having side portions and a center tread portion for making contact with the terrain when in said expanded condition;

means to mount said side portions of said outer tube to said rim such that said outer tube forms a chamber;

an inner tube mounted within said chamber expandable from a stored condition within said chamber to an expanded condition expanding said outer tube to said expanded condition such that said center tread portion is supported by said inflated inner tube and said tire is suitable for moving the vehicle over the terrain;

means coupled to said inner tube for receiving a pressurized gas for inflating said inner tube to said expanded condition; and a protective cover comprising:

first and second flexible cover portions having first ends secured to said rim and second ends disposed in interconnected relation when said outer tube is in said stored condition; and means to releasably secure said second ends of said first and second cover portions together.

7. The vehicle as set forth in claim 6 wherein said side portions of said tire assembly are folded over said center tread portion when said outer tube is in said stored condition.

8. The vehicle as set forth in claim 7 wherein said means to mount said side portions of said outer tube of said tire assembly to said rim comprises:

said rim having a first and second circumferential flanges on either side thereof;

said side portions having first and second circumferential end portions mating with said first and second circumferential flanges, respectively;

first and second retaining rings mating with said first and second circumferential flanges, respectively; and means to secure said first and second retaining rings to said first and second circumferential flanges with said first and second circumferential end portions secured to said rim therebetween.

9. The vehicle as set forth in claim 8 wherein said means to secure said first and second retaining rings of said tire assembly to said first and second circumferential flanges comprises:

said first and second flanges including a plurality of threaded fastener holes spaced about the periphery thereof;

said circumferential end portions and said retaining rings having fastener holes therethrough spaced about the periphery thereof; and fasteners extending through said holes in said retaining rings and said circumferential end portions and engaging said threaded fastener holes.

10. The vehicle as set forth in claim 6 wherein said means to releasably secure said first and second ends of said first and second cover portions of said tire assembly together is a hook and loop type fastener.

* * * * *